(No Model.)  3 Sheets—Sheet 1.
C. E. BUELL.
SYSTEM OF ELECTRIC STORAGE AND SUPPLY.
No. 270,734. Patented Jan. 16, 1883.
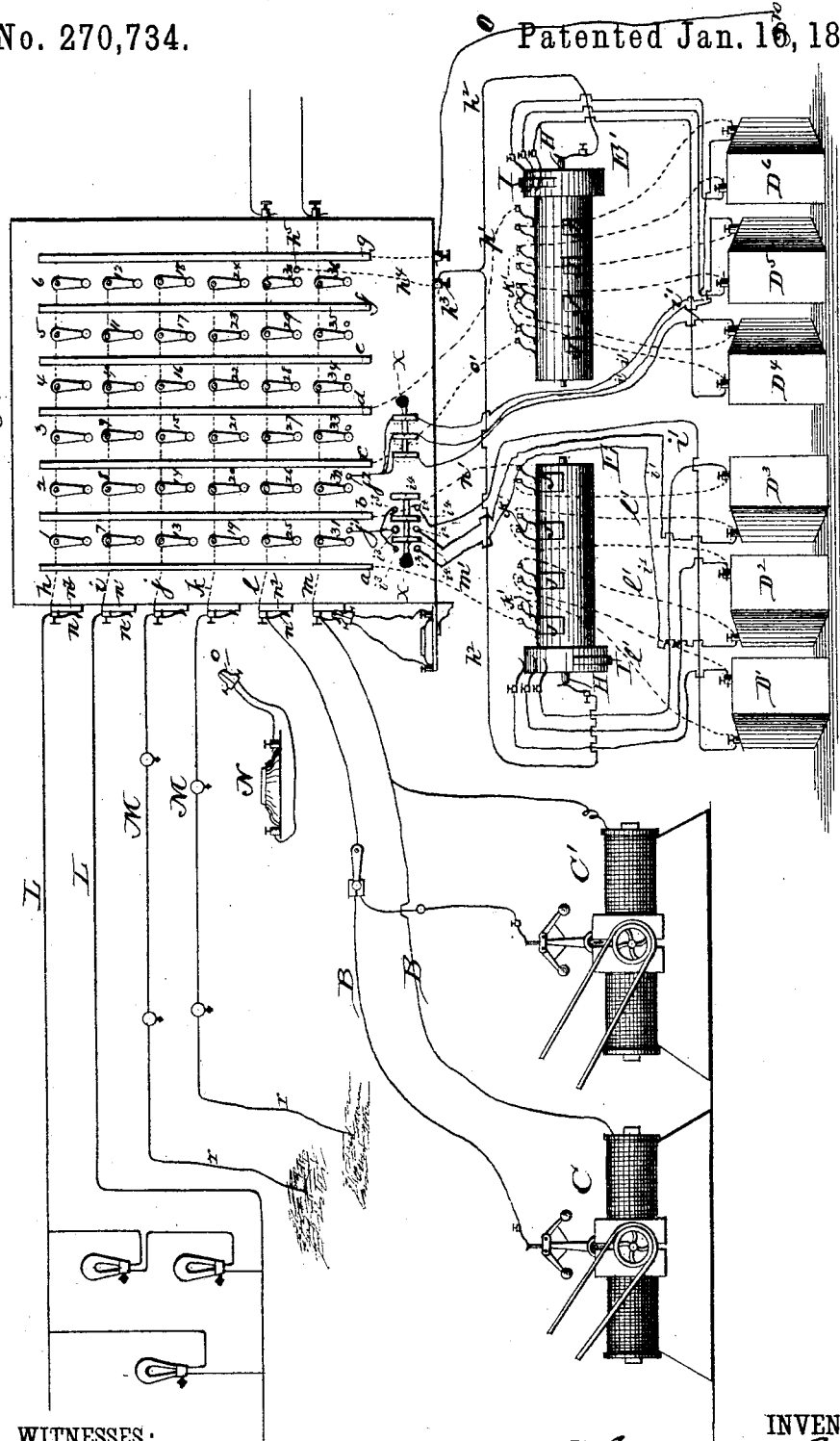
WITNESSES:
Fred. G. Dieterich.
P. C. Dieterich.
INVENTOR.
Charles E. Buell,
by Melville Church
His ATTORNEY.

(No Model.)  3 Sheets—Sheet 2.
C. E. BUELL.
SYSTEM OF ELECTRIC STORAGE AND SUPPLY.
No. 270,734. Patented Jan. 16, 1883.
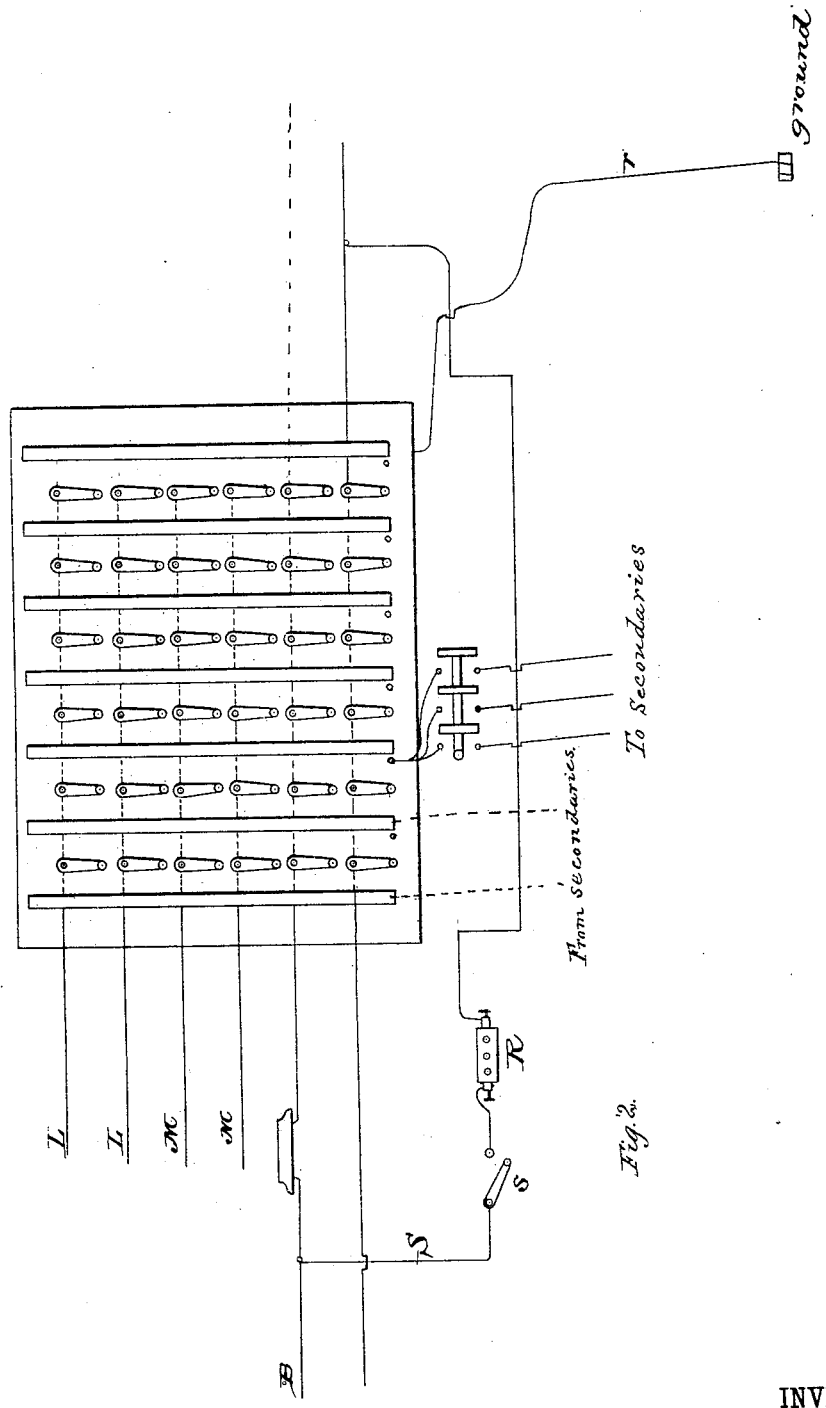
WITNESSES:
INVENTOR.

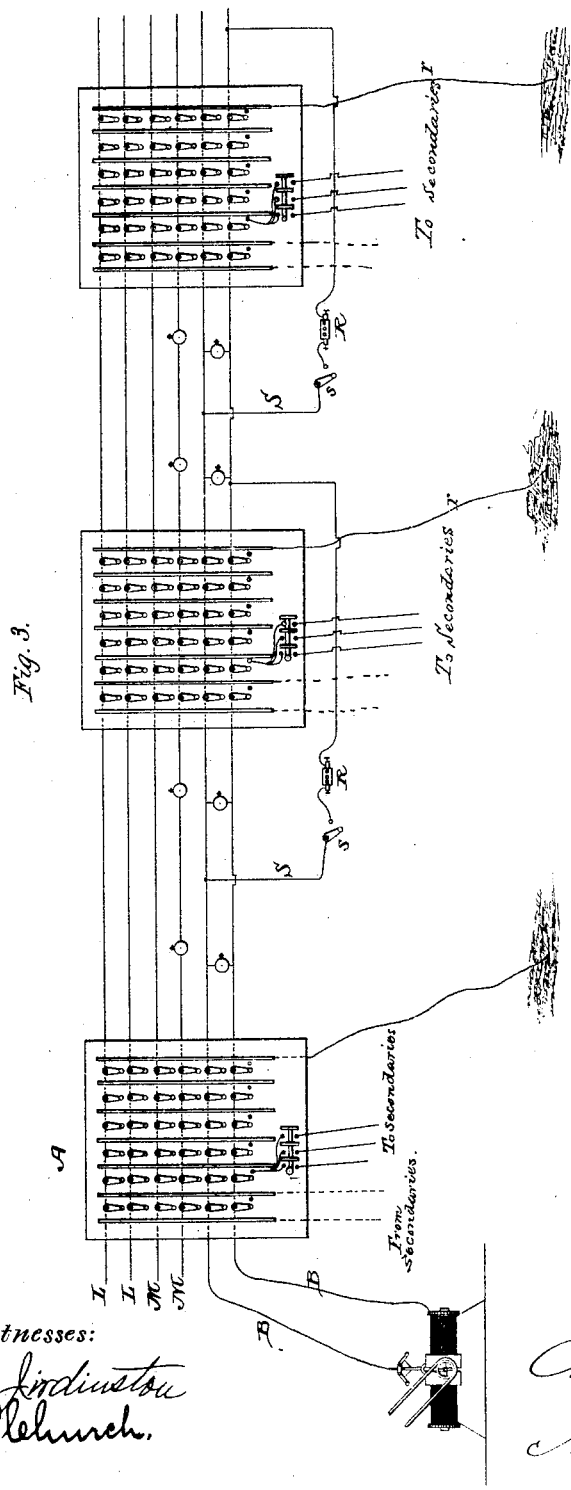

UNITED STATES PATENT OFFICE.

CHARLES E. BUELL, OF NEW HAVEN, CONNECTICUT.

SYSTEM OF ELECTRIC STORAGE AND SUPPLY.

SPECIFICATION forming part of Letters Patent No. 270,734, dated January 16, 1883.

Application filed May 15, 1882. (No model.)

*To all whom it may concern:*

Be it known that I, CHARLES E. BUELL, of New Haven, in the county of New Haven and State of Connecticut, have invented certain new and useful Improvements in Systems of Electrical Storage and Supply; and I do hereby declare the following to be a full, clear, and exact description of the same, reference being had to the accompanying drawings, forming part of this specification, and to the figures and letters of reference marked thereon.

My invention has for its object to provide a system of electrical storage and supply by which electricity can be furnished for electric lighting and other purposes with the greatest economy; and to this end it consists in the several novel combinations of elements going to make up a complete system, which I will now proceed to describe, and particularly point out in the claims at the end of this specification.

In the accompanying drawings, Figure 1 represents a central station equipped in accordance with my invention; Fig. 2, the equipment of one of the outlying stations, and Fig. 3 a diagram showing a central station and two outlying stations connected thereto.

A, Fig. 1, indicates the central-office switchboard, consisting of a series of conducting-strips, $a\ b\ c\ d\ e\ f\ g$, and a series of conducting line-strips, $h\ i\ j\ k\ l\ m$, containing switches 1 to 36, inclusive, which are adapted to be turned and connected to the several strips $a\ b\ c\ d\ e\ f\ g$ so as to electrically connect the latter with any of the line-strips, as will be readily understood. Any other preferred form of switchboard that will accomplish the object may be employed instead of the one shown.

B represents a main charging-circuit, adapted to be charged by one or both of a series of dynamo-electric machines, C C', or other electric-current generators, and connected with the line-strips $l\ m$ of the switch-board, as shown.

$D'\ D^2\ D^3$ and $D^4\ D^5\ D^6$ represent two series of secondary batteries or accumulators of any well-known type; and E E', switching devices, by means of which the said two series of secondary batteries can be coupled for quantity to be charged, either successively or together.

The shaft H of each switch is connected by a wire, $h^2$, to a binding-post, $h^3$, on the switch-board, and to this binding-post leads a conductor, $h^4$, which terminates in a contact, $h^5$, that is adapted to be placed in connection with the main charging-circuit by means of the switch-arm 30. The shaft H of each switch is further electrically connected to a conducting projection, I, on the larger part of the rotatory switch, and from this conducting-projection extend wires to the similar poles of all the secondary batteries controlled by that switch. From the opposite poles of all the batteries controlled by said switch extend wires $i'\ i'\ i'$, which terminate at contacts $i^2\ i^2\ i^2$ in the case of series of batteries $D'\ D^2\ D^3$, and in similar contacts (not shown) in the case of the batteries $D^4\ D^5\ D^6$. Opposite the series of contacts $i^2\ i^2\ i^2$ is a corresponding series of contacts, $i^3\ i^3\ i^3$, from which converge wires which unite in a common wire terminating in a contact, $j'$, in the case of batteries $D'\ D^2\ D^3$ and at a contact, $j^2$, in the case of batteries $D^4\ D^5\ D^6$. Switches X, having conducting crosspieces $i^4\ i^4\ i^4$, are adapted to connect or disconnect the wires of the contacts $i^2$, &c., with the series of contacts $i^3$, &c., when desired. This arrangement of mechanism enables the batteries of each series to be coupled together for quantity. Switch-arms 31 and 32 in the main charging-circuit are adapted to connect with the contacts $j'$ and $j^2$, respectively. The rotating switches E E' are further provided with conducting-projections J J J J on their smaller portions, by means of which, in connection with pairs of contacts $k'\ k'$, lines $l'$, and terminal lines $m'\ n'$ and $o'\ p'$, each series of batteries is adapted to be coupled for intensity, as will be readily understood. The terminal lines $m'\ n'$ of one series connect with the conducting-strips $a\ b$ of the switch-board, while the terminal lines of the other series connect to the conducting-strips $c\ d$ of said switchboard.

L L and M M represent separate working-circuits, into which the stored energy of the secondary batteries is adapted to be discharged. Circuit L L is shown as including a series of electric lamps in multiple arc, and as connected to the line-strips $h\ i$ of the switch-board, while circuit M M is shown connected to the line-strips $j\ k$, and is designed for use for electric lighting, or for other purposes.

The switch E' is turned in that position which causes it to couple the series of batteries which it controls for quantity. When, then, the switch X is closed, switch-arm 32 is turned to contact $j^2$, and the switch-arm 30 is turned to contact $h^5$, the current from the main charging-circuit will be directed through the batteries $D^4\ D^5\ D^6$, and the latter will be charged. The switch E, on the other hand, is shown turned in that position which causes it to couple the series of batteries under its control in tension series. Upon the turning of the switch-arm 1 to strip $a$ and switch-arm 7 to strip $b$ the batteries $D'\ D^2\ D^3$ will be discharged into the working-circuit L L. By further manipulations of the switch-arms the currents from the batteries may be discharged into the circuit M M, or into the circuits L L and M M, or into one or the other or all of any number of circuits centering at the switch-board.

The two series of secondaries may be arranged to be charged and discharged alternately or together by the proper control of the switches.

Each main-line strip is provided with a spring-contact, $n$, and a fixed contact, $n^2$, and a galvanometer, N, is adapted to be connected by the insertion of its plug $o$ between any two of such contacts into the charging-circuit or into either of the working-circuits, in order that from the central station the direction of flow and strength of current in any of said circuits may be readily ascertained or any circuit tested.

The conducting-strip $g$ of the switch-board is preferably grounded through a line, O, at the central station, and either or all of the working-circuit conductors may be grounded, as shown at $r$. By the provision of these ground-connections and by a proper manipulation of the switch-board the dynamo can be included in either of the working-circuits, so as to supply the same by a direct current; or the current from the dynamo can be directed wholly through the secondary batteries in multiple arc to charge them; or it may be divided and part diverted into one or more of the working-circuits and part through the secondary batteries to charge them. The secondary batteries may also be connected to any of the circuits centering at the switch-board, so as to discharge into the same.

At each of the outlying stations in my system, as shown in Figs. 2 and 3, I employ a switch-board substantially like the one at the central station, also a series of secondary batteries, $p'\ p^2\ p^3$, and a ground-connection, $r$. The charging-circuit B is adapted to be shunted around the switch-board by means of a shunt-wire, S, containing a switch, $s$, and an adjustable resistance, R, so that the secondary batteries may be removed and replaced without interruption of the charging-circuit, and so that the main charging-circuit can be maintained continuous and in condition suitable for signalling, electric lighting, telegraphic, or other purposes.

By my system the direct current from one or more generators can be utilized in whole or in part for electric lighting or other purposes and stored in part or in whole in secondary batteries at any number of stations in a city, and by means of the several switch-boards and their accessories the electrical condition of each circuit can be tested.

In applying the invention to an electric lighting system for cities, the direct current from the generator or generators may be stored during the day, while at night it may be employed to maintain electric arc or incandescent lights on one or more circuits while the stored current is being utilized on one or more other circuits.

By preference I make the strips, connecting-switches, and other conducting parts of the switch-boards employed extra heavy, in order to adapt them to the handling of powerful currents; and I prefer a form of switch that widely separates the connecting parts when disconnected to prevent the strong currents from overleaping the break.

Having thus described my invention, I claim as new—

1. In a system of electrical supply, the combination, at a station, of a dynamo or charging circuit and several working-circuits centering thereat, one or more series of groups of secondary batteries, and a switch-board having appliances, substantially as described, for interconnecting the several circuits and for connecting and disconnecting the secondary batteries to and from the several circuits, whereby the current of the dynamo in the dynamo or charging circuit may be employed to charge the secondary batteries, and while the latter are being discharged into one or more of the working-circuits said dynamo current may be diverted into others of the working-circuits.

2. In a system of electrical supply, the combination of a dynamo or charging circuit and several working-circuits, a series of stations arranged upon said circuits, each station containing one or more series or groups of secondary batteries, and a switch-board having appliances, substantially as described, for interconnecting the several circuits, and for connecting and disconnecting the secondary batteries to and from the several circuits, all substantially as described, for the purpose specified.

3. In a system of electrical supply, the combination, at a station, of a dynamo or charging circuit and several working-circuits centering thereat, one or more series or groups of secondary batteries, and a switch-board having appliances, substantially as described, for interconnecting the several circuits, and for connecting and disconnecting the secondary batteries to and from the several circuits, and a shunt-wire around the switch-board containing a switch and an adjustable resistance, whereby the dynamo or charging current or a portion thereof may be passed around the switch-board to supply remote stations, and whereby also a continuous circuit is maintained for signaling, telegraphic, or other purposes which will not be ruptured by the manipulation of the central switch-board, substantially as described.

CHARLES E. BUELL.

Witnesses:
MELVILLE CHURCH,
FRED F. CHURCH.